(12) United States Patent
Zurek

(10) Patent No.: US 7,610,265 B2
(45) Date of Patent: Oct. 27, 2009

(54) DATA QUERY VERIFICATION

(75) Inventor: Thomas Zurek, Walldorf (DE)

(73) Assignee: SAP AG, Walldorf (DE)

( * ) Notice: Subject to any disclaimer, the term of this patent is extended or adjusted under 35 U.S.C. 154(b) by 369 days.

(21) Appl. No.: 11/117,895

(22) Filed: Apr. 29, 2005

(65) Prior Publication Data

US 2006/0248052 A1 Nov. 2, 2006

(51) Int. Cl.
G06F 7/00 (2006.01)
G06F 17/30 (2006.01)

(52) U.S. Cl. .............................. 707/2; 707/5
(58) Field of Classification Search ....................... None
See application file for complete search history.

(56) References Cited

U.S. PATENT DOCUMENTS

| 5,293,616 | A | * | 3/1994 | Flint ............................. 707/3 |
| 5,742,806 | A | | 4/1998 | Reiner et al. |
| 5,819,255 | A | | 10/1998 | Celis et al. |
| 5,890,151 | A | * | 3/1999 | Agrawal et al. ................. 707/5 |
| 5,913,207 | A | * | 6/1999 | Chaudhuri et al. .............. 707/2 |
| 5,926,813 | A | * | 7/1999 | Chaudhuri et al. .............. 707/5 |
| 5,950,186 | A | * | 9/1999 | Chaudhuri et al. .............. 707/2 |
| 5,956,706 | A | | 9/1999 | Carey et al. |
| 6,199,062 | B1 | * | 3/2001 | Byrne et al. .................... 707/3 |
| 6,353,818 | B1 | | 3/2002 | Carino, Jr. |
| 6,529,901 | B1 | | 3/2003 | Chaudhuri et al. |
| 6,643,646 | B2 | | 11/2003 | Su |
| 6,738,755 | B1 | | 5/2004 | Freytag et al. |
| 6,763,359 | B2 | | 7/2004 | Lohman et al. |
| 6,778,979 | B2 | | 8/2004 | Grefenstette et al. |
| 6,879,976 | B1 | * | 4/2005 | Brookler et al. ................. 707/3 |
| 6,898,588 | B2 | * | 5/2005 | Kosciuszko et al. ............. 707/2 |
| 2002/0184133 | A1 | | 12/2002 | Zangari et al. |
| 2002/0198867 | A1 | | 12/2002 | Lohman et al. |
| 2003/0088558 | A1 | | 5/2003 | Zaharioudakis et al. |
| 2004/0083204 | A1 | | 4/2004 | Dettinger et al. |
| 2004/0215626 | A1 | | 10/2004 | Colossi et al. |
| 2004/0267765 | A1 | | 12/2004 | Tkachuk et al. |
| 2005/0015367 | A1 | * | 1/2005 | Cazemier et al. ................ 707/3 |
| 2005/0044098 | A1 | | 2/2005 | Dettinger et al. |
| 2005/0076045 | A1 | * | 4/2005 | Stenslet et al. ............... 707/101 |
| 2005/0149484 | A1 | * | 7/2005 | Fox et al. ........................ 707/1 |
| 2005/0234947 | A1 | * | 10/2005 | Minder et al. ................ 707/100 |
| 2006/0149407 | A1 | * | 7/2006 | Markham et al. ............ 700/108 |
| 2006/0241923 | A1 | * | 10/2006 | Xu et al. ......................... 703/2 |

* cited by examiner

*Primary Examiner*—Neveen Abel Jalil
*Assistant Examiner*—Michael J Hicks
(74) *Attorney, Agent, or Firm*—Mintz, Levin, Cohn, Ferris, Glovsky and Popeo, P.C.

(57) ABSTRACT

A method determines whether a structural indicator of a first table of results generated from a first data repository query matches a corresponding structural indicator of a second table of results generated from a substantially identical second data repository query. If the first and second table structural indicators match, then values from at least two corresponding cells from each of the first and second tables are aggregated. If the aggregated values from the first and second tables are identical, then an indication is provided indicating that the first data repository query results are accurate. Related apparatuses, computer program products, and computer systems are also described.

14 Claims, 6 Drawing Sheets

| Product Group | Month | Profit | Quantity |
|---|---|---|---|
| DB | 2003.01 | 16991.00 | 7150 |
| OS | 2003.01 | 35078.00 | 10130 |
| PC | 2003.01 | 40409.00 | 9100 |
| TOOL | 2003.01 | 33610.00 | 7240 |
| MOUSE | 2003.01 | 20762.00 | 4960 |
| OFFICE | 2003.01 | 66484.00 | 17900 |
| MONITOR | 2003.01 | 45065.00 | 15940 |
| PRINTER | 2003.01 | 38647.00 | 13930 |
| INTERNET | 2003.01 | 34393.00 | 15750 |
| KEYBOARD | 2003.01 | 57969.00 | 15350 |
| DB | 2003.02 | 25367.00 | 5770 |
| OS | 2003.02 | 7079.00 | 7780 |
| PC | 2003.02 | 37019.00 | 14820 |
| TOOL | 2003.02 | 12346.00 | 4630 |
| MOUSE | 2003.02 | 30577.00 | 7430 |
| OFFICE | 2003.02 | 25593.00 | 11240 |
| MONITOR | 2003.02 | 55031.00 | 17850 |
| PRINTER | 2003.02 | 23031.00 | 6810 |
| INTERNET | 2003.02 | 44599.00 | 13320 |
| KEYBOARD | 2003.02 | 12268.00 | 8470 |

300

| Product Group | Month | Profit | Quantity |
|---|---|---|---|
| DB | 2003.01 | 16991.00 | 7150 |
| OS | 2003.01 | 35078.00 | 10130 |
| PC | 2003.01 | 40409.00 | 9100 |
| TOOL | 2003.01 | 33610.00 | 7240 |
| MOUSE | 2003.01 | 20762.00 | 4960 |
| OFFICE | 2003.01 | 66484.00 | 17900 |
| MONITOR | 2003.01 | 45065.00 | 15940 |
| PRINTER | 2003.01 | 38647.00 | 13930 |
| INTERNET | 2003.01 | 34394.00 | 15750 |
| KEYBOARD | 2003.01 | 57969.00 | 15350 |
| DB | 2003.02 | 25367.00 | 5770 |
| OS | 2003.02 | 7079.00 | 7780 |
| PC | 2003.02 | 37019.00 | 14820 |
| TOOL | 2003.02 | 12346.00 | 4630 |
| MOUSE | 2003.02 | 30577.00 | 7430 |
| OFFICE | 2003.02 | 25593.00 | 11240 |
| MONITOR | 2003.02 | 55031.00 | 17850 |
| PRINTER | 2003.02 | 23031.00 | 6809 |
| INTERNET | 2003.02 | 44599.00 | 13320 |
| KEYBOARD | 2003.02 | 12268.00 | 8470 |

400

| Column 1 | Column 2 | Column 3 |
|---:|---:|---:|
| 49 | 74 | 47 |
| 34 | 12 | 11 |
| 66 | 68 | 16 |
| 30 | 22 | 57 |
| 56 | 37 | 88 |
| 78 | 69 | 36 |
| 92 | 95 | 88 |
| 56 | 38 | 62 |

| Column 1 | Column 2 | Column 3 |
|---:|---:|---:|
| 49 | 74 | 47 |
| 34 | 12 | 11 |
| 66 | 68 | 16 |
| 30 | 22 | 57 |
| 56 | 36 | 88 |
| 78 | 69 | 36 |
| 92 | 95 | 88 |
| 56 | 38 | 62 |

FIG. 7

| Product Group | Month | Profit | Quantity |
|---:|---:|---:|---:|
| 4442 | 323030333031 | 16991.00 | 7150 |
| 4F53 | 323030333031 | 35078.00 | 10130 |
| 5043 | 323030333031 | 40409.00 | 9100 |
| 544F4F4C | 323030333031 | 33610.00 | 7240 |
| 4D4F555345 | 323030333031 | 20762.00 | 4960 |
| 4F4646494345 | 323030333031 | 66484.00 | 17900 |
| 4D4F4E49544F52 | 323030333031 | 45065.00 | 15940 |
| 5052494E544552 | 323030333031 | 38647.00 | 13930 |
| 494E5445524E4554 | 323030333031 | 34393.00 | 15750 |
| 4B4559424F415244 | 323030333031 | 57969.00 | 15350 |
| 4442 | 323030333032 | 25367.00 | 5770 |
| 4F53 | 323030333032 | 7079.00 | 7780 |
| 5043 | 323030333032 | 37019.00 | 14820 |
| 544F4F4C | 323030333032 | 12346.00 | 4630 |
| 4D4F555345 | 323030333032 | 30577.00 | 7430 |
| 4F4646494345 | 323030333032 | 25593.00 | 11240 |
| 4D4F4E49544F52 | 323030333032 | 55031.00 | 17850 |
| 5052494E544552 | 323030333032 | 23031.00 | 6810 |
| 494E5445524E4554 | 323030333032 | 44599.00 | 13320 |
| 4B4559424F415244 | 323030333032 | 12268.00 | 8470 |

700

| Product Group | Month | Profit | Quantity |
|---|---|---|---|
| 550 | 582 | 16991.00 | 7150 |
| 578 | 582 | 35078.00 | 10130 |
| 563 | 582 | 40409.00 | 9100 |
| 670 | 582 | 33610.00 | 7240 |
| 713 | 582 | 20762.00 | 4960 |
| 716 | 582 | 66484.00 | 17900 |
| 808 | 582 | 45065.00 | 15940 |
| 804 | 582 | 38647.00 | 13930 |
| 841 | 582 | 34393.00 | 15750 |
| 817 | 582 | 57969.00 | 15350 |
| 550 | 583 | 25367.00 | 5770 |
| 578 | 583 | 7079.00 | 7780 |
| 563 | 583 | 37019.00 | 14820 |
| 670 | 583 | 12346.00 | 4630 |
| 713 | 583 | 30577.00 | 7430 |
| 716 | 583 | 25593.00 | 11240 |
| 808 | 583 | 55031.00 | 17850 |
| 804 | 583 | 23031.00 | 6810 |
| 841 | 583 | 44599.00 | 13320 |
| 817 | 583 | 12268.00 | 8470 |

800

DATA QUERY VERIFICATION

TECHNICAL FIELD

The subject matter described herein relates to verifying the results of a computer-based data query.

BACKGROUND

Data warehouses as well as other data repositories are used to integrate data across an enterprise. Such data may periodically be accessed/characterized through queries of the data warehouse. In some arrangements, the results of a query may be calculated at two or more different times and/or using two or more different query techniques. In order to determine whether there are any deviations in the query results, a comparison among the calculated results may be performed.

In some cases, a query may have been processed in which the corresponding result table has been proven or verified to be accurate. Subsequently, the same query is executed in order to determine if recent code changes or alternative query execution procedures still deliver the correct result table. In other cases, a query may be simultaneously executed on two systems and the results may be subsequently compared in order to guarantee accuracy. Such simultaneous query execution may be implemented, for example, in N-version software (NVS), for fault tolerance purposes in mission-critical tasks.

FIG. 3 illustrates an example of a query result that consists of a table 300 of m columns and n rows. In total, there are m*n values v(i,j) with $1 \leq i \leq n$, $1 \leq j \leq m$ (i.e., v(i,j)=value to be found row i column j, e.g., v(2, 3)=35078.00). FIG. 4 shows a second example of a query result table 400 similar to that illustrated in the table 300 of FIG. 3 but having minor differences (indicated in bold and in underline).

Conventional techniques for verifying that two query results (e.g., result tables 300, 400 from FIG. 3 and FIG. 4) are similar and/or identical, typically (i) check that the number of results rows (or cells) are identical, and if that is the case, (ii) conduct a cell-wise comparison of the results. However, the amount of time to process a n*m cell comparison operation may be lengthy (in the worst case, i.e. time complexity is O(n*m)). Moreover, such an operation may also consume significant memory/storage resources (i.e., the space required in memory or on disk is 2*n*m (i.e., space complexity is also O(n*m)).

Furthermore, in some configurations, the cell-wise comparison may require the result tables to be sorted in advance. As sorting has a time complexity of O(n*log n), such an operation also greatly increases the amount of time required to verify the query results. Alternatively, simple search techniques requiring even more time and consuming more resources may be employed to selectively retrieve the value of certain cells for comparison purposes.

SUMMARY

In one aspect, a method may comprise determining whether a structural indicator of a first table of results generated from a first data repository query matches a corresponding structural indicator of a second table of results generated from a substantially identical second data repository query, aggregating values from at least two corresponding cells from each of the first and second tables if the first and second table structural indicators match, and providing an indication that the first data repository query results are accurate if the aggregated values from the first and second tables are identical.

The structural indicator may be a number of rows, a number of columns, or a number of cells of the tables and the like. The method may convert non-numerical values in each table into integer values prior to the aggregating. Such a conversion may comprise mapping each non-numerical value into an integer value. In addition, or in the alternative, the conversion may comprise mapping each non-numerical value into a hexadecimal format value, and converting each hexadecimal format value into an integer value.

A single change sensitive aggregating function may be used that indicates if there is a single change or variation in one table as compared to another. The method may alternatively, or in addition, provide that the queries of the data repository (which may be a data warehouse) are identical. In other words, the data repository may receive identical queries at differing points in time and the comparison verifies that the query results are identical/consistent. In such configurations, the first table may be a reference table that is used to compare each subsequent query result table. Alternatively, the first and second tables may be simultaneously generated on different query generation systems and the comparison is used to ensure that there are no inconsistencies (e.g., for mission critical applications).

The aggregated value may comprise any statistical measure indicative of differences between two or more query result tables. For example, the aggregated value may be a sum of at least a portion of the cells in each table, a minimum value in at least a portion of the cells in each table, a maximum value in at least a portion of the cells in each table, an average value in at least a portion of the cells in each table, a median value in at least a portion of the cells in each table, and the like.

In another aspect, an apparatus may comprise a comparison unit to determine whether a structural indicator of a first table of results generated from a first data repository query matches a corresponding structural indicator of a second table of results generated from a substantially identical second data repository query, an aggregation unit to aggregate values from at least two corresponding cells from each of the first and second tables if the first and second table structural indicators match, and an indication unit to provide an indication that the first data repository query results are accurate if the aggregated values from the first and second tables are identical.

The apparatus may optionally include or be coupled to the data repository (such as a data warehouse) and/or a query unit (which may form part of a N-version software system) to query the data repository and generate the first and second tables. The apparatus may also include or be coupled to a display unit or other graphical user interface to provide an indication to a user that the query results are accurate or otherwise consistent. Alternatively, the apparatus may provide an indication to a network node or other computing device whether the query results are accurate.

In addition or in the alternative, the apparatus may also include a conversion unit to convert non-numerical values in each table into integer values prior to the aggregating by the aggregation unit. The conversion unit may map each non-numerical value into an integer value, and/or it may map each non-numerical value into a hexadecimal format value, and convert each hexadecimal format value into an integer value.

Computer program products, which may be embodied on computer readable-material, are also described. Such computer program products may include executable instructions that cause a computer system to conduct one or more of the method acts described herein.

Similarly, computer systems are also described that may include a processor and a memory coupled to the processor.

The memory may encode one or more programs that cause the processor to perform one or more of the method acts described herein.

The subject matter described herein provides many advantages. It allows for more rapid determinations to be made regarding the accuracy of a query result table while consuming minimal processing resources including memory and disk space. In particular, the current techniques may be valuable as a quality assurance tool that traces one reference result table (per query) for a large number of test queries. With such an application, the same test queries may be repeatedly executed and the respective result table rapidly and efficiently compared to the respective reference result table.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 7 is a conversion of the table in FIG. 1 in which the non-numerical values in the Product Group column have been converted to hexadecimal format.

DETAILED DESCRIPTION

Figure 1:
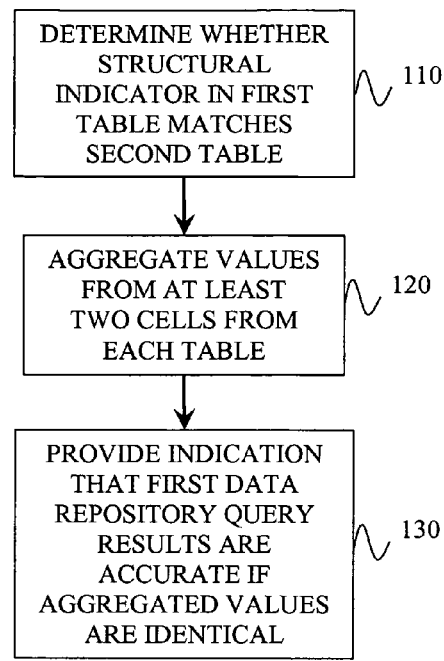
FIG. 1 is a process flow diagram illustrating a method for determining the accuracy of a data query.

FIG. 1 illustrates a method 100, that at step 110, determines whether a structural indicator of a first table of results generated from a first data repository query matches a corresponding structural indicator of a second table of results generated from a substantially identical second data repository query. Thereafter, at step 120, if the first and second table structural indicators match, values from at least two corresponding cells from each of the first and second tables are aggregated. At step 130, an indication that the first data repository query results are accurate is provided if the aggregated values from the first and second tables are identical.

Figure 2:
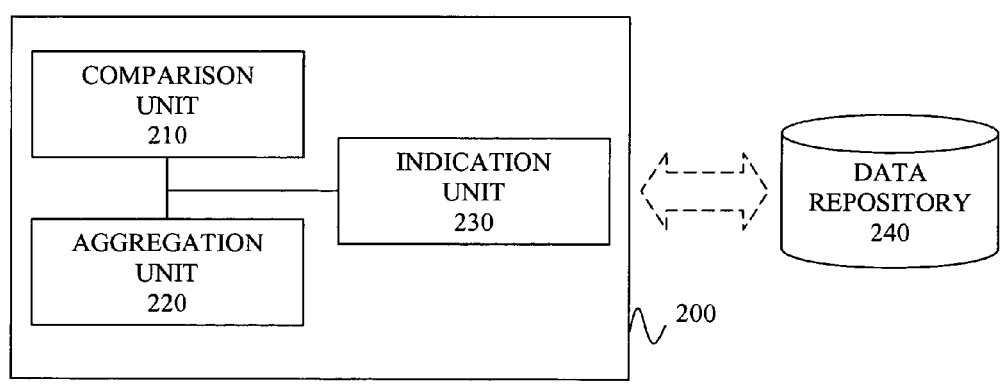
FIG. 2 is a schematic of an apparatus to determine the accuracy of a data query.

FIG. 2 illustrates an apparatus 200 that includes a comparison unit 210, an aggregation unit 220, and an indication unit 230. The comparison unit 210 determines whether a structural indicator of a first table of results generated from a first data repository query matches a corresponding structural indicator of a second table of results generated from a substantially identical second data repository query. The aggregation unit 220 aggregates values from at least two corresponding cells from each of the first and second tables if the first and second table structural indicators match. The indication unit 230 provides an indication that the first data repository query results are accurate if the aggregated values from the first and second tables are identical. Optionally, the apparatus 200 may be coupled to a data repository 240.

The following provides useful information for understanding and implementing the subject matter described herein as well as optional variations that may be implemented singly or in combination depending on the desired configuration.

In some variations, the large majority of result tables based on the same query are identical. While the following describes the aggregation of all cell values of a result table into a single numeric value, it will be appreciated that only a portion of the cell values may be aggregated. For example, only certain highly sensitive portions of a result table may aggregated in order to further minimize processing time and resource consumption.

Aggregation values may be calculated, as described below, after it has been determined whether a structural indicator of a first table of results matches a corresponding structural indicator of a second table of results. These table of results may be from substantially identical queries (i) initiated at different times; (ii) querying different data warehouses, and/ or (iii) executed using different procedures. The structural indicator may be, for example, a number of rows, columns, and/or cells in each table of results.

Figure 3:
FIG. 3 is a first illustrative query result table containing non-numerical and integer values.
Figure 5:
FIG. 5 is a first illustrative query result table containing only integer values.

In some variations, result tables, such as the table 300 in FIG. 3, may include non-numerical values such as strings (e.g., 'INTERNET'), dates, (e.g., 2003.01), binary-code decimals or float or integer numbers (e.g., 25593.00) and the like. The techniques described herein provide mechanisms to overcome such heterogeneous data types to allow aggregation. For example, with reference to the table 500 in FIG. 5 (table "T"), standard aggregation functions such as SUM (sum of all cell values), MIN (minimum of all cell values), MAX (maximum of all cell values), AVG (average of all cell values) may be applied because all of the cell values are integers. Calculating the aggregation values for T for the mentioned aggregation functions delivers:

$SUM(T)=1281$ $MIN(T)=11$ $MAX(T)=95$ $AVG(T)=53.375$

Figure 6:
FIG. 6 is a second illustrative query result table containing only integer values.

The table 600 of FIG. 6 (table "T'") is almost identical to table T but differs in one single cell value (indicated by underlining). Calculating the mentioned aggregations for T' provides:

$SUM(T)=1280$ $MIN(T)=11$ $MAX(T)=95$ $AVG(T)=53.33333$

As can be seen, statistical aggregated values such as MIN and MAX are not sensitive to this minor difference (e.g., 36 v. 37) while SUM and AVG reflect the difference in the aggregated value.

In certain cases, such as in the table 300 of FIG. 3, the query results may contain values that are both integer and non-numerical values. Such non-numerical values may be mapped to numbers in order to ensure a hexadecimal representation of a value in a programming environment (i.e., after mapping/converting the non-numerical representation, every value is stored in a byte-presentation in memory, which in turn may be expressed as a string of hexadecimal digits). Many programming languages allow an easy access to that representation intrinsically or via a library call. In Advanced Business Application Programming (ABAP), for example, a value stored in variable I_ANY (of an arbitrary atomic data type) may be converted into a string of hexadecimal digits (to be accessed by a field symbol <L_XSTRING>) by the following command:

ASSIGN i_any TO<1_xstring> CASTING TYPE x.

A sample conversion of the table 300 of FIG. 3 from a mix of integer and non-numerical values (into a hexadecimal representation) is shown in the table 700 of FIG. 7.

Figure 8:
FIG. 8 is a conversion of the table in FIG. 7 in which the hexadecimal values in the Product Group column have been converted to integers.

The digits in the hexadecimal strings in the Product column of the table 700 of FIG. 7 may then be aggregated into one single number, e.g. by summing them up. The table 800 of FIG. 8 illustrates the conversion of such hexadecimal strings.

As described above, not every aggregation function is equally suitable. In particular, there are aggregation functions that are sensitive to a change of a single value (like SUM, AVG) and some that are not (like MIN, MAX). In some variations, a single-change-sensitive aggregation function may be utilized that:

is a function f that aggregates a list of values $x_1, x_2, \ldots, x_i, \ldots, x_n$ to a single value $f(x_1 \ldots, x_n)$, and has the property that $f(x_1, x_2, \ldots, x_i, \ldots x_n) \neq f(x_1, x_2, \ldots, y, \ldots, x_n)$ for all $x_i \neq y$.

Figure 4:
FIG. 4 is a second illustrative query result table containing non-numerical and integer values.

Such an arrangement provides a stronger indicator whether two or more query result tables differ. However, even single-change-sensitive aggregation functions do not guarantee that $f(T) \neq f(T')$ for every $T \neq T'$. As an example, with table T 300 of FIG. 3 and table T' 400 of FIG. 4, if SUM is used as the single-change-sensitive aggregation function: in this case, more than one value has changed and the differences compensate each other.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A computer-implemented method comprising:
    determining whether a structural indicator of a first table of results generated from a first data repository query of a data warehouse matches a corresponding structural indicator of a second table of results generated from a substantially identical second data repository query of the data warehouse, the structural indicators consisting of: one or more of a number of rows, a number of columns, or a number of cells in the corresponding table, the first data repository query occurring being run against the data warehouse prior in time to the second data repository query;
    aggregating values from at least two corresponding cells from each of the first and second tables if the first and second table structural indicators match; and
    providing an indication that the first data repository query results are accurate if the aggregated values from the first and second tables are identical.

2. A method as in claim 1, wherein the results of the first data repository query are generated using a first execution procedure and the results of the second data repository query are generated using a second execution procedure.

3. A method as in claim 1, further comprising converting non-numerical values in each table into integer values prior to the aggregating.

4. A method as in claim 2, wherein the converting comprises:
    mapping each non-numerical value into a hexadecimal format value; and
    converting each hexadecimal format value into an integer value.

5. A method as in claim 3, wherein the converting comprises mapping each non-numerical value into an integer value.

6. A method as in claim 1, wherein the aggregating uses a single change sensitive aggregating function that is based on every value in a table.

7. A method as in claim 1, wherein the at least one aggregated value is a statistical value chosen from a group comprising: a sum of at least a portion of the cells in each table, a minimum value in at least a portion of the cells in each table, a maximum value in at least a portion of the cells in each table, an average value in at least a portion of the cells in each table, and a median value in at least a portion of the cells in each table.

8. A computer program product, tangibly embodied on computer readable-material, said computer program product including executable instructions that cause a computer system to conduct one or more of operations comprising:

determining whether a structural indicator of a first table of results generated from a first data repository query of a data warehouse matches a corresponding structural indicator of a second table of results generated from a substantially identical second data repository query of the data warehouse, the structural indicators consisting of one or more of a number of rows, a number of columns, or a number of cells in the corresponding table, the first data repository query being run against the data warehouse prior in time to the second data repository query, at least one cell in each table of results comprising a non-numerical value and at least one cell in each table comprising an integer value;

converting non-numerical values into a corresponding integer value for each table of results;

aggregating integer values from at least two corresponding cells from each of the first and second tables if the first and second table structural indicators match; and providing an indication that the first data repository query results are accurate if the aggregated values from the first and second tables are identical.

9. An article as in claim 8, wherein the results of the first data repository query are generated using a first execution procedure and the results of the second data repository query are generated using a second execution procedure.

10. An article as in claim 8, wherein the converting comprises mapping each non-numerical value into an integer value.

11. An article as in claim 10, wherein the converting comprises:

mapping each non-numerical value into a hexadecimal format value; and converting each hexadecimal format value into an integer value.

12. An article as in claim 8, wherein the aggregating uses a single change sensitive aggregating function that is based on every value in a table.

13. An article as in claim 8, wherein the at least one aggregated value is a statistical value chosen from a group comprising: a sum of at least a portion of the cells in each table, a minimum value in at least a portion of the cells in each table, a maximum value in at least a portion of the cells in each table, an average value in at least a portion of the cells in each table, and a median value in at least a portion of the cells in each table.

14. A computer program product, tangibly embodied on computer readable-material, said computer program product including executable instructions that cause a computer system to conduct one or more of operations comprising:

determining whether a structural indicator of a first table of results generated from a first data repository query of a data warehouse matches a corresponding structural indicator of a second table of results generated from a substantially identical second data repository query of the data warehouse, the structural indicators consisting of one or more of a number of rows, a number of columns, or a number of cells in the corresponding table, the first data repository query occurring being run against the data warehouse prior in time to the second data repository query, at least one cell in each table of results comprising a non-numerical value and at least one cell in each table comprising an integer value;

converting non-numerical values into a corresponding integer value for each table of results;

aggregating integer values from at least two corresponding cells from each of the first and second tables if the first and second table structural indicators match; and providing an indication that the first data repository query results are accurate if the aggregated values from the first and second tables are identical.

* * * * *

UNITED STATES PATENT AND TRADEMARK OFFICE
CERTIFICATE OF CORRECTION

PATENT NO.       : 7,610,265 B2                                                Page 1 of 1
APPLICATION NO.  : 11/117895
DATED            : October 27, 2009
INVENTOR(S)      : Thomas Zurek It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 443 days.

Signed and Sealed this

Twelfth Day of October, 2010

David J. Kappos
*Director of the United States Patent and Trademark Office*